Dec. 31, 1929. J. P. GRABER 1,741,695
MACHINE DRIVE
Filed Aug. 4, 1927
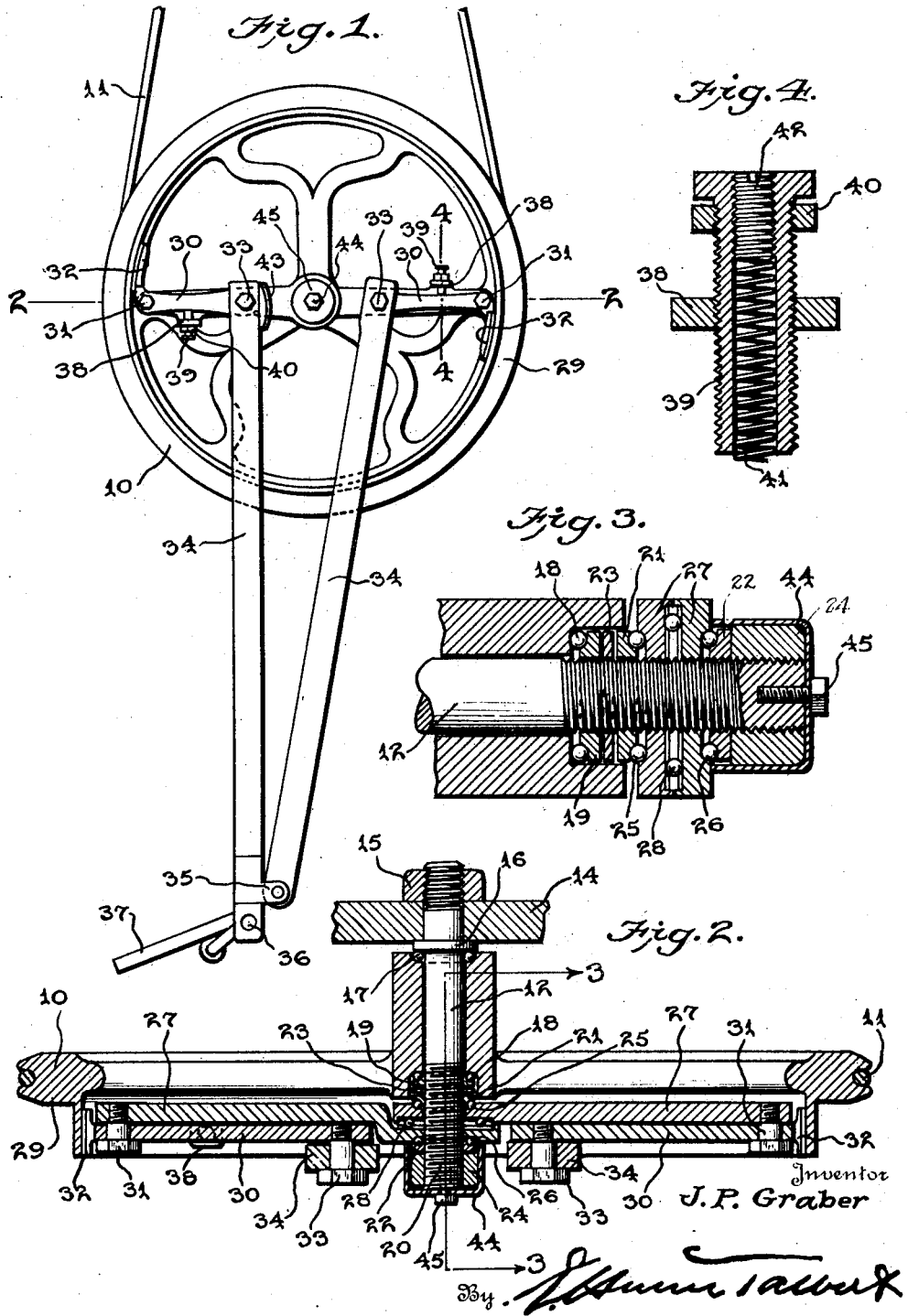
Inventor
J. P. Graber Patented Dec. 31, 1929

1,741,695

UNITED STATES PATENT OFFICE

JONATHAN P. GRABER, OF BLOOMFIELD, MONTANA

MACHINE DRIVE

Application filed August 4, 1927. Serial No. 210,676.

The object of the invention is to provide a mechanism adapted for application to machines the operation of which require rotary motion and in which the driving means is oscillatory or reciprocatory, as when a treadle is used; to provide a construction of this character in which a driving force is imparted during both strokes of the reciprocatory or oscillatory member; to provide a construction in which the condition commonly known as a dead center is effectively avoided; and to provide a construction in which effective braking action is had when the reciprocatory member is retained or held at either extremity of its stroke.

With this object in view, the invention consists in a construction and combination of parts of which a preferred embodiment is illustrated in the accompanying drawings, wherein:

Figure 1 is a side elevational view showing the application of the invention as a driving means for a sewing machine, such parts of the latter as are necessary only to a full understanding of the invention being shown.

Figure 2 is a sectional view on the plane indicated by the line 2—2 of Figure 1.

Figure 3 is a detail sectional view on the plane indicated by the line 3—3 of Figure 2.

Figure 4 is a detail sectional view on the plane indicated by the line 4—4 of Figure 1.

In the illustrated embodiment of the invention the drive wheel 10 which is of the conventional form used in sewing machines is peripherally grooved for the reception of the belt 11 by means of which the machine is driven. The drive wheel is rotatably mounted on the fixed or stationary shaft 12, the latter being secured in the frame 14 of the machine by means of a nut 15 which engages the threaded extremity of the shaft and abuts the outer face of the frame, the shaft being shouldered as indicated at 16 to provide an inner abutment so that rigid connection with the frame may be secured. Ball bearings 17 and 18 provide for the free running of the drive wheel, the latter being retained by a cone 19 carried on the threaded portion 20 of the shaft 12. Cones 21 and 22 are mounted on the threaded portion, being threadingly engaged with the latter and the former is seated against a washer 23 interposed between it and the cone 19. The latter cone, when properly positioned is retained at the proper setting by means of a lock nut 24. The cones 21 and 22 support the ball bearings 25 and 26, the latter providing for the free swinging movement of the arms 27 between which is interposed a ball thrust bearing 28.

The arms extend radially from the shaft 12 and lie within the rim portion 29 of the drive wheel. Pivotally mounted at the extremities of the arms are bell-crank levers 30, these levers being carried on screw studs 31 threadingly engaged with the arms. The shorter arms of the bell-crank levers are of arcuate shape being formed to substantially the same radius as the inner peripheral surface of the rim 29 and on their outer faces are provided with friction plates 32. Rocked in one direction on their pivot studs 31, the friction faces 32 engage the inner periphery of the rim 29. Rocked in the other direction, they are released from such engagement. The levers 30 extend radially inward and adjacent the shaft are provided with screw studs 33 with which the extremities of the pitmen 34 are pivotally connected. The two pitmen are pivotally connected together at the remote ends as indicated at 35 and one of them has a pivotal connection 36 with a treadle 37.

The arms 27 are provided with integral ears 38 overhanging the longer arms of the levers 30 and threadingly engaged in these ears are the sleeves 39 which are adjustable ears by reason of the threads, the desired adjustment being maintained by means of lock nuts 40 threadingly engaged with the sleeves and abutting the ears. Compression springs 41 are housed in the sleeves the outer ends of which are interiorly threaded for the reception of blind adjusting screws 42, the latter bearing upon the ends of the springs of which the opposite ends bear on the edges of the longer arms of the levers 30.

One of the pitmen 34 is provided with a cushion 43 serving as a spacer between it and the other pitman when the two are brought close together as at the extremities of the strokes of the treadle 37.

A dust cap 44 encloses the lock nut 24, the core 22 and ball bearing 26, being retained in position by a screw 45 threadingly engaged with a tapped hole in the extremity of the threaded portion 20 of the shaft 12.

In the operation of the invention, the depression of the treadle will exert perforce a pull on both pitmen and thus tend to rock the bell-crank levers on their pivotal connections on the arms 27. Since the bell-crank levers are on opposite sides of the axis of the wheel, however, the friction foot of one will be brought into firm frictional engagement with the inner periphery of the rim 29 but the other will be rocked away from such engagement. Therefore on the down stroke of the treadle one of the levers operates as a means for communicating motion to the wheel. On the release or upward movement of the treadle the previously engaged lever will be released and the other thrown into engagement with the inner peripheral surface of the rim. Thus both strokes of the treadle serve to communicate rotary motion to the drive wheel and by reason of the fact that the spacer 43 prevents the pitmen from coming together at their upper ends the pivotal connection of neither with its respective lever 30 will at any time fall in a line passing through the axis of the drive wheel and the pivotal connection of the pitman with the treadle. Therefore there can be no such condition as a dead center and irrespective of the position of the drive wheel, the latter may always be started initially by pressure upon the treadle. Also the construction provides for a braking action in that continued pressure on the treadle at the end of its stroke will apply a force tending to rock one of the levers 30 and thus bring its friction foot into binding engagement with the inner periphery of the rim 29, thus resisting movement of the wheel as long as pressure is maintained on the treadle.

The springs 41 serve as a means for impelling the levers in a direction to force the friction feet into engagement with the rim and thus provide against lost motion and rattling while retaining the levers in their most effective pickup position for gripping action on the rim.

The invention having been described, what is claimed as new and useful is:

A machine drive comprising a drive wheel provided with a rim, arms pivotally mounted for swinging movement about the axis of the drive wheel, bell-crank levers pivotally mounted at the outer extremities of said arms, the shorter arms of said levers being adapted for gripping action on said wheel rim and the longer arms terminating adjacent the axis of the drive wheel, a reciprocatory member, pitmen pivotally connected at one end with the reciprocatory member and at the remote ends with the inner extremities of said levers, and cushioning means carried by the arms and yieldingly impelling the levers in one direction.

In testimony whereof he affixes his signature.

JONATHAN P. GRABER.